United States Patent Office 3,461,170
Patented Aug. 12, 1969

3,461,170
HYDROXYLATION OF AROMATIC COMPOUNDS
Louis Schmerling, Riverside, Ill., assignor to Universal Oil Products Company, Des Plaines, Ill., a corporation of Delaware
No Drawing. Filed Nov. 8, 1965, Ser. No. 506,850
Int. Cl. C07c 37/00, 39/00
U.S. Cl. 260—613    9 Claims

ABSTRACT OF THE DISCLOSURE

Nuclear hydroxylation of a nuclearly substituted aromatic compound by treating the compoundd with $H_2O_2$ in the presence of substantially anhydrous HF at a temperature of $-10°$ to $100°$ C.

---

This invention relates to a process for the hydroxylation of aromatic compounds. More particularly, the invention is concerned with a process whereby one or more hydroxyl groups are introduced on an aromatic nucleus.

Hydroxylated aromatic compounds are finding a wide variety of uses in the chemical field. For example, hydroquinone is an important chemical which is utilized in photographic developers, in dye intermediates, in medicine, as an antioxidant for fats and oils, as an inhibitor in coating compounds for rubber, stone and textiles, in paints and varnishes, as well as in motor fuels and oils. In addition, it is an intermediate for preparing mono- and dibenzyl ethers of hydroquinone, the latter compounds being used as stabilizers, antioxidants, solvents, as well as being used in perfumes, plastics and pharmaceuticals. Catechol finds a wide variety of uses as an antiseptic in photography, dye-stuffs, antioxidants and light stabilizers. Furthermore, it is an intermediate for the preparation of the dimethyl ether of catechol which is used as an antiseptic and for the methyl ether of catechol which is guaiacol, guaiacol being an important component of many medicines.

Likewise, phenol and cresols are used in phenolic resins as disinfectants, flotation agents, surfactants, scouring compounds, lube oil additives, photographic developers, intermediates in ink, paint and varnish removers, etc. In addition, hydroxy substituted aromatic carbohydrate derivatives may be used as intermediates in detergents, water-soluble pharmaceuticals, explosives, gelling agents, surface coatings, resins and oxidation inhibitors.

It is therefore an object of this invention to provide a process for preparing hydroxylated aromatic compounds.

A further object of this invention is to provide a process for introducing hydroxyl substituents in the nucleus of an aromatic compound to provide useful chemical compounds.

In one aspect, an embodiment of this invention resides in a process for the nuclear hydroxylation of an aromatic compound which comprises treating said compound with hydrogen peroxide in the presence of hydrogen fluoride at hydroxylation conditions, and recovering the resultant hydroxylated aromatic compound.

A further embodiment of this invention is found in a process for the nuclear hydroxylation of an aromatic compound which comprises treating said compound with an aqueous solution of hydrogen peroxide containing from about 5% to about 90% hydrogen peroxide or more in the presence of hydrogen fluoride at a temperature in the range of from about $-10°$ to about $100°$ C. and at ambient pressure, and recovering the resultant hydroxylated aromatic compound.

A specific embodiment of this invention is found in a process for the nuclear hydroxylation of phenol which comprises treating phenol with an aqueous solution of hydrogen peroxide containing from about 5% to about 90% hydrogen peroxide in the presence of hydrogen fluoride at a temperature in the range of from about 0° to about 40° C. and at ambient pressure, and recovering the resultant hydroquinone and catechol.

Other objects and embodiments will be found in the following further detailed description of this invention.

It is hereinbefore set forth that the present invention is concerned with a process for introducing hydroxyl substituents on the ring of an aromatic compound, said hydroxylation being effected by treating an aromatic compound with hydrogen peroxide in the presence of hydrogen fluoride. The starting materials which may be utilized in the process of this invention comprise aromatic hydrocarbons and derivatives thereof. The term "aromatic compound" as used in the present specification and appended claims will refer to these hydrocarbons and derivatives thereof and will include primary and secondary alkyl aromatic hydrocarbons such as toluene, o-xylene, m-xylene, p-xylene, ethylbenzene, cumene (isopropylbenzene), n-propylbenzene, cyclohexylbenzene, 1-methylnaphthalene, 2-methylnaphthalene, 1-ethylnaphthalene, 2-ethylnaphthalene, 1,2-dimethylnaphthalene, 1,2 - diethylnaphthalene, methylbiphenyl, ethylbiphenyl, etc.; hydroxy-substituted aromatic compounds such as phenol, hydroquinone, catechol, resorcinol, 1-hydroxynaphthalene, 2-hydroxynaphthalene, 1,2 - dihydroxynaphthalene, etc.; alkoxy-substituted aromatic compounds such as anisole, phenetol, n-propoxybenzene, o-methylanisole, m-methylanisole, p-methylanisole, m-ethylanisole, p-ethylanisole, o-methylphenetol, m - methylphenetol, p - methylphenetol, etc.; halo alkyl aromatic compounds such as o-chlorotoluene, m - chlorotoluene, p - chlorotoluene, o - bromotoluene, m-bromotoluene, p-bromotoluene, o-chloroethylbenzene, m-chloroethylbenzene, p-chloroethylbenzene, o-bromoethylbenzene, m - bromoethylbenzene, p - bromoethylbenzene, 2-chloro-1-methylnaphthalene, 2-bromo-1-methylnaphthalene, 4-chloro - 1 - methylnaphthalene, 4-bromo-1-methylnaphthalene, 2-chloro-1-ethylnaphthalene, 4-bromo-1-ethylnaphthalene, etc.; aromatic carbohydrate derivatives of aromatic compounds such as 1,1-diphenyl-1-desoxy-D-glucitol, 1,1-ditolyl-1-desoxy-D-glucitol, 1,1-bis-(p-isopropylphenyl)-1-desoxy - D - glucitol, 1,1 - bis-(p-methoxyphenyl)-1-desoxy - D - glucitol, 1,1-bis - (p-hydroxyphenyl)-1-desoxy-D-glucitol, the corresponding aromatic derivatives of other hexoses (fructose, sorbose, tagatose, psicose, idose, gulose, talose), glycolaldehyde, trioses, tetraoses, pentoses, etc. It is to be understood that the aforementioned compounds are only representative of the type of aromatic hydrocarbons and derivatives thereof which may be utilized as starting materials in the hydroxylation process of the present invention and that said invention is not necessarily limited thereto. Utilizable aromatic derivatives may be represented by the following generic formula: $R_mArX_n$ in which Ar is a monocyclic or polycyclic aromatic hydrocarbon nucleus, R is independently selected from the group consisting of n-alkyl, sec-alkyl, cycloalkyl hydroxyl, alkoxyl and hydroxyalkyl radicals, X is independently selected from the group consisting of hydrogen, halogen and nitro substituents, $m$ and $n$ are integers of at least one.

It is also contemplated within the scope of this invention that heterocyclic compounds such as a quinoline may be treated with hydrogen peroxide in the presence of hydrogen fluoride according to the process of this invention. While the aforementioned list of compounds discloses the presence of primary and secondary alkylated aromatic hydrocarbons as well as hydroxy and alkoxy substituted aromatic compounds it has been found that unalkylated benzene derivatives including benzene, halobenzenes such as chlorobenzene, bromobenzene, etc., nitrobenzenes, etc., will usually react less substantially than the corresponding alkylated or hydroxylated derivatives and will yield a difficultly separatable mixture of polyhydroxy aromatic compounds and other derivatives thereof.

The process of this invention is effected by treating an aromatic compound of the type hereinbefore set forth in greater detail with hydrogen peroxide in the presence of a catalyst comprising hydrogen fluoride. The hydrogen peroxide may be present in an aqueous solution containing from 5 up to 90% or more hydrogen peroxide. The preferable hydrogen peroxide solution will contain a 30–50% or higher concentration of hydrogen peroxide inasmuch as when utilizing a lesser amount, the aqueous portion of the solution will tend to dilute the catalyst which is preferably charged to the reaction zone in anhydrous form. When the concentration of the hydrogen fluoride catalyst falls below a figure of about 60 to 70%, the reaction will slow down and eventually cease; therefore, it is necessary to maintain the concentration of hydrogen fluoride in an amount greater than 60% and preferably greater than 80% and thus necessitate the use of a relatively concentrated hydrogen peroxide solution. It is also contemplated, if so desired, that an additional compound such as boron trifluoride or a ferrous fluoborate having the formula: $FeF_2 \cdot BF_3$ may be utilized as a promoter to increase the catalytic acidity and thereby permit the reaction to proceed in such a manner as to provide increased yields of the desired produce. In addition, the reaction is effected under hydroxylation conditions which will include temperatures ranging from about $-10°$ up to about $100°$ C. or more and preferably at a temperature in the range of from about $0°$ to about $40°$ C. The reaction pressure which is utilized will preferably comprise ambient pressure, although somewhat higher pressure may be used, the pressure being that which is necessary to maintain a substantial portion of the reactants and the catalyst in the liquid phase.

The obtention of either a monohydroxylated aromatic compound or polyhydroxylated aromatic compound can be varied according to the amount of aromatic compound which is treated with the hydrogen peroxide. For example, if a monohydroxylated aromatic compound is desired, an excess of the starting aromatic compound will be used. Conversely, if a polyhydroxylated aromatic compound comprises the desired product, the relative amount of hydrogen peroxide which is used will be increased. Generally speaking, the aromatic compound will be present in a mole ratio in the range of from about 3:1 to about 15:1 moles of aromatic compound per mole of hydrogen peroxide, although greater or lesser amounts of aromatic compounds may also be used.

The process of the present invention may be effected in either a batch or continuous type operation. For example, when a batch type operation is used, a quantity of the aromatic compound is placed in an appropriate apparatus such as, for example, a stirred autoclave, along with the hydrogen fluoride. The hydrogen peroxide is added thereto and the reaction allowed to proceed for a predetermined residence time under the hydroxylation conditions hereinbefore set forth in greater detail. The residence time may vary from about 0.5 hour up to about 5 hours or more in duration. Upon completion of the desired residence time, the catalyst is purged from the reactor utilizing a stream of inert gas such as nitrogen and the reaction product thereafter recovered. Following this, the reaction product is subjected to conventional means for recovery, said means including washing the product with an inert organic solvent, neutralization of any hydrogen fluoride which may still be present, flashing off the solvent and subjecting the reaction product to fractional distillation to recover the desired compounds.

It is also contemplated that the process of this invention may be effected in a continuous manner of operation. When such a process is used, the aromatic compound is continuously charged to a reaction zone which is maintained at the proper operating conditions of temperature and pressure. In addition, the hydrogen peroxide in the form of an aqueous solution containing from 5% up to about 90% or more hydrogen peroxide is continuously charged to the reaction zone. The reaction is allowed to proceed in the presence of a hydrogen fluoride catalyst present in the reactor or continuously charged for a predetermined time of from about 0.01 hour to about 2 hours, following which the reactor effluent is continuously withdrawn. The hydrogen peroxide and the hydrogen fluoride may be premixed and the resulting solution fed continuously to the reactor. The reaction product is separated from the catalyst and the former is subjected to treatment similar to that hereinbefore set forth to recover the desired hydroxylated aromatic compound.

Examples of hydroxylated aromatic compounds which may be prepared according to the process of this invention include o-hydroxytoluene (o-cresol), p-hydroxytoluene (p-cresol), 2-hydroxy-p-xylene, 4-hydroxy-o-xylene, 2-hydroxyethylbenzene (o-ethylphenol), 2,4-dihydroxyethylbenzene, 2-hydroxy-p-cymene, 2-hydroxy-1-methylnaphthalene, 2,4-dihydroxy-1-methylnaphthalene, 1-hydroxy-2-methylnaphthalene, 1,4-dihydroxy-2-methylnaphthalene, 2-hydroxy-1-methylanthracene, 2,4-dihydroxy-1-methylanthracene, catechol, hydroquinone, hydroxyquinone, pyrogallol, guaiacol, 2-hydroxyphenetol, 2,4-dihydroxyanisole, 2,4-dihydroxyphenetol, 2-hydroxy-p-methylanisole, 2-hydroxy-p-ethylanisole, 2-hydroxy-o-chlorotoluene, 2-hydroxy-o-bromotoluene, 4-hydroxy-o-chlorotoluene, 4-hydroxy-o-bromotoluene, 5-hydroxy-o-chlorotoluene, 5-hydroxy-o-bromotoluene, 1,1-di-(p-hydroxyphenyl)-1-desoxy-D-glucitol, 1,1-di-(p-hydroxyphenyl)-1-desoxy-D-mannitol, etc. It is to be understood that the aforementioned compounds are only representative of the class of hydroxylated aromatic compounds which may be prepared and that the present invention is not necessarily limited thereto.

The following examples are given to illustrate the process of the present invention which, however, are not intended to limit the generally broad scope of the present invention in strict accordance therewith.

Example I

In this example, 368 g. (4.0 mole) of toluene was placed in a stainless steel turbomixer autoclave. Following this, 218 g. (10.9 mole) of hydrogen fluoride was charged thereto. Thereafter, 43.7 g. of a 30% aqueous hydrogen peroxide solution was gradually charged to the reactor, the peroxide addition being accomplished during a period of 65 minutes. The mole ratio of toluene to hydrogen peroxide was 10.3:1. The mixture was stirred for an additional period of 10 minutes, the temperature during the entire 75 minutes of contact time being maintained in a range of from about $26°$ to about $34°$ C. At the end of the predetermined contact time, the hydrogen fluoride was swept out of the autoclave with a stream of nitrogen for a period of about 2 hours before the autoclave was opened.

The reaction product was transferred to a beaker and the reactor parts washed with benzene, the washings being added to the reaction product. The solution was decanted into another beaker thereby separating out a small amount of an aqueous acid phase which contained some benzene-insoluble product. The decanted benzene solution was treated to remove residual hydrogen fluoride, filtered under suction and distilled to remove benzene and unreacted toluene. The benzene-insoluble product which remained in the reactor was combined with that product in the aqueous acid phase and extracted with ether. The extract was treated to remove residual hydrogen fluoride and subjected to distillation to remove the ether. The bottoms from both product segments were combined and subjected to fractional distillation under reduced pressure. There was recovered 21.9 g. of isomeric cresols consisting of 13.9 g. of o-cresol, 7.4 g. of p-cresol and 0.6 g. of m-cresol,

Example II

In this experiment, the charge comprised 424 g. (4.0 mole) of ethylbenzene. This charge was placed in an autoclave of the type hereinbefore set forth in Example I above after which 215 g. of anhydrous hydrogen fluoride and 41.5 g. of 30% hydrogen peroxide solution were charged to the autoclave following the procedure of Example I. The autoclave was immersed in an ice bath and maintained at a temperature in the range of from about 0° to about 7° C. during the reaction time, said reaction time being 60 minutes. At the end of this time, the hydrogen fluoride was purged from the autoclave by means of a stream of nitrogen for a period of about 2 hours. The autoclave was then opened and the reaction product recovered. The autoclave was washed with benzene and the washings combined with the reaction product. A phase separation occurred when the solution ws decanted into another vessel. After neutralization and recovery of the benzene by distillation, the bottoms were combined with the bottoms from the ether extract of the aqueous layer which had also been treated in a manner similar to that set forth in Example I above. Distillation of the bottoms yielded a mixture of o-ethylphenol, p-ethylphenol and ethylhydroquinone.

Example III

To a stainless steel turbomixer autoclave was charged 108.2 g. (1.0 mole) of anisole and 500 cc. n-pentane solvent, said autoclave being immersed in an ice bath so that the temperature was maintained in a range of from about 0° to about 5° C. Following this, 235 g. of anhydrous hydrogen fluoride and 32.8 g. of a 30% hydrogen peroxide solution were added, folowing the procedure of Example I, the hydrogen peroxide addition being accomplished during a period of about 53 minutes. Upon completion of the addition of the hydrogen peroxide the mole ratio of anisole to hydrogen peroxide charged was 3.4:1. The reaction mixture was stirred for an additional 7 minutes to bring the total contact time to 60 minutes. At the end of this time, the hydrogen fluoride was purged from the reactor by means of a stream of nitrogen for a period of 2 hours. The reaction product was then poured into a vessel and the autoclave parts washed with benzene. Upon addition of the benzene to the reaction product a lower aqueous acid phase separated from the benzene phase. The benzene phase was then neutralized, the benzene was removed by distillation and the bottoms subjected to fractional distillation under reduced pressure. Infrared analysis of the product disclosed the presence of o-methoxyphenol and p-methoxyphenol.

Example IV

In this experiment, 424 g. (4.0 mole) of m-xylene was treated in a manner similar to that set forth in the above examples, that is, by adding 222 g. of anhydrous hydrogen fluoride and 43.7 g. of a 30% hydrogen peroxide solution to the autoclave which was maintained at a temperature in the range of from about 0° to about 12° C. The addition of the hydrogen peroxide was accomplished during a period of about 30 minutes, followed by an additional stirring period of 30 minutes to make a total contact time of 60 minutes. At the end of this time, the hydrogen fluoride was purged by means of a stream of nitrogen and the reaction product was recovered and treated in a manner similar to that set forth in the above examples. The bottoms from the benzene phase and the aqueous phase were combined and subjected to fractional distillation under reduced pressure. Infrared analysis of the cuts resulting from the distillation disclosed the presence of 2,4-xylenol (i.e., 2,4-dimethylphenol), 2,6-xylenol and 3,5-xylenol, the 2,4-xylenol being present in the greatest amount.

Example V

A charge stock of 507 g. (4 mole) of o-chlorotoluene and 500 cc. of n-pentane was placed in an autoclave. Following this, 208 g. of anhydrous hydrogen fluoride and 38.2 g. of a 30% hydrogen peroxide solution were added thereto. The addition of the hydrogen peroxide was accomplished during a period of 80 minutes while the temperature of the autoclave was maintained in a range of from about 0° to about 6° C. by means of an ice bath. Upon completion of the addition of the hydrogen peroxide, the reaction mixture was stirred for an additional 10 minutes making a total contact time of 90 minutes. At the end of this time, the hydrogen fluoride was flushed from the autoclave by means of a stream of nitrogen for a period of about 2 hours. The reaction product was treated in a manner similar to that set forth in the above examples, the desired hydroxylated o-chlorotoluene being recovered by pentane extraction.

Example VI

In this example, 396 g. (3.7 mole) of o-cresol was treated with 44.8 g. of a 30% hydrogen peroxide solution and 223 g. of anhydrous hydrogen fluoride for a total contact time of 60 minutes in an autoclave, the temperature of which was maintained in a range of from about 2° to about 7° C. by means of an ice bath. At the end of the desired residence time, the hydrogen fluoride was purged by means of a nitrogen stream and the reaction product subjected to treatment in a manner similar to that set forth in the above examples. After removal of the solvents including benzene and ether, the bottoms were subjected to fractional distillation under reduced pressure. The cuts boiling at from 120° C. to 150° C. at 2.4 mm. pressure comprising 2,3-dihydroxytoluene were recovered. In addition, a minor amount of 2,5-dihydroxytoluene was also recovered.

Example VII

A mixture of 282 g. (3.0 mole) of phenol and 220 g. of benzene was placed in a stainless steel turbomixer autoclave. The temperature of the autoclave was maintained in a range of from about 20° to about 27° C. To the autoclave were charged 423 g. of hydrogen fluoride and 32.8 g. of a 30% hydrogen peroxide solution, the addition of the hydrogen peroxide being accomplished during a period of about 44 minutes. The reaction mixture was stirred for an additional period of 16 minutes thus making a total contact time of 60 minutes. At the end of this time, the hydrogen fluoride was purged from the autoclave by means of a stream of nitrogen for about 2 hours prior to opening the autoclave. The reaction product was transferred to a vessel while the autoclave and turbomixer superstructure was washed with benzene, the benzene washings being combined with the bulk product. Following this, the benzene solution was decanted into a separate vessel, said process resulting in a separation of the benzene solution from a lower aqueous acid layer which contained some product which is relatively benzene-insoluble. The aqueous acid layer was washed with benzene and then extracted with ether wash. Both the benzene solution and the ether extract were neutralized to remove any free hydrogen fluoride which may have still been present and thereafter filtered under suction. The solvents and unreacted phenol were removed by distillation under reduced pressure and the bottoms were permitted to crystallize. Infrared analysis of the bottoms disclosed that it was chiefly a mixture of catechol and hydroquinone.

Example VIII

To illustrate the necessity for utilizing an aromatic compound which contains an alkyl or hydroxyl substituent, several compounds which did not fall within this class were utilized as charge stocks in an attempted hydroxylation process. Chlorobenzene, nitrobenzene, benzene and naphthalene were treated with hydrogen fluoride and hydrogen peroxide in a manner similar to that set forth in the above examples. In the case of chlorobenzene, the product was a dark brown fuming liquid. The autoclave and turbomixer superstructure were washed with pentane, however, an insoluble dark brown liquid product still adhered to the reactor parts. The removal of this material was accomplished using a dilute sodium hydroxide solution. This alkaline extract plus additional alkali solution was used to neutralize the bulk product. It was impossible to extract the alkali-treated product inasmuch as an attempt to do so resulted in a stable emulsion. The emulsified product was evaporated to dryness over steam and the resultant dry product was extracted with hot benzene and the benzene-extract was thereafter evaporated yielding no residue. The benzene-extracted solid was dissolved in 500 cc. of water and filtered. The filtrate was acidified and extracted with ether. Distillation of the ether extract resulted in the obtention of less than 5 g. of a black tar.

The product resulting from the attempted hydroxylation of nitrobenzene was a fuming amber liquid consisting of two phases. The lower aqueous phase was extracted with benzene and after evaporation a few grams of a residue which were found to be inorganic by ignition were obtained. The upper layer was extracted with benzene and neutralized. After acidification of the alkaline extract, followed by salting and extraction with ether, the extract was dried and distilled, there being obtained less than 2 grams of a dark brown liquid.

Likewise, when benzene and naphthalene were utilized as starting materials, the resultant products were black, high-boiling and high-melting solids which could not be characterized.

Example IX

As a further illustration of the operability of the present process, an experiment was performed in which 502 g. of cyclohexylbenzene (an aromatic hydrocarbon in which the cycloalkyl group is attached by means of a secondary carbon atom) was placed in a stainless steel turbomixer autoclave. Following this, 212 g. of anhydrous hydrogen fluoride was charged thereto. The autoclave was maintained at a temperature in the range of from about 0° to about 6° C. while 33.9 g. of a 30% hydrogen peroxide solution was slowly added during a period of 63 minutes. The reaction mixture was stirred for an additional 17 minutes, thus making a total reaction time of 90 minutes. At the end of this time, the hydrogen fluoride was purged by means of a stream of nitrogen, following which the reaction product was recovered and treated in a manner similar to that set forth in the above examples. There was obtained 13 g. of alkali-soluble product.

I claim as my invention:

1. A process for the nuclear hydroxylation of an aromatic compound having the formula $$R_mAr$$

in which Ar is an aromatic hydrocarbon nucleus, R is a nuclear substituent independently selected from the group consisting of primary alkyl, secondary alkyl, cycloalkyl, hydroxyl and alkoxyl, and $m$ is 1 or 2, which process comprises treating said aromatic compound with hydrogen peroxide in the presence of hydrogen fluoride maintained at a concentration greater than 60% HF at a temperature of from about $-10°$ to about 100° C., and recovering the resultant hydroxylated aromatic compound in which said nuclear substituent is retained.

2. The process as set forth in claim 1, further characterized in that it is effected at a temperature in the range of from about 0° to about 40° C. and at ambient pressure and said hydrogen peroxide comprises an aqueous solution containing from about 5% to about 90% hydrogen peroxide.

3. The process as set forth in claim 1, further characterized in that said aromatic compound is an n-alkylaromatic hydrocarbon.

4. The process as set forth in claim 1, further characterized in that said aromatic compound is a sec-alkylaromatic compound or a cycloalkylaromatic compound.

5. The process as set forth in claim 1, further characterized in that said aromatic compound is a hydroxy aromatic compound.

6. The process as set forth in claim 1, further characterized in that said aromatic compound is toluene and said hydroxylated aromatic compound comprises a mixture of cresols.

7. The process as set forth in claim 1, further characterized in that said aromatic compound is phenol and said hydroxylated aromatic compound comprises a mixture of hydroquinone and catechol.

8. The process as set forth in claim 1, further characterized in that said aromatic compound is anisole and said hydroxylated aromatic compound comprises a mixture of o-methoxyphenol and p-methoxyphenol.

9. The process as set forth in claim 1, further characterized in that said aromatic compound is m-xylene and said hydroxylated aromatic compound comprises a mixture of 2,4-xylenol, 2,6-xylenol, and 3,5-xylenol.

References Cited

UNITED STATES PATENTS 2,644,014  6/1953  Saunders.

FOREIGN PATENTS 723,454  2/1955  Great Britain.

OTHER REFERENCES

Henderson, et al., Jour. Chem. Soc., vol. 97 (1910), pp. 1659–1669.

Thomas, Anhydrous Aluminum Chloride in Org. Chem. (1941), p. 878.

Kovacic et al., Jour. Amer. Chem. Soc., vol. 87 (1965), pp. 1566–1567.

BERNARD HELFIN, Primary Examiner

U.S. Cl. X.R.

260—620, 621, 623, 624, 625